Jan. 7, 1958 J. P. JONES, JR 2,819,395
DRIVING CIRCUITS FOR STATIC MAGNETIC ELEMENTS
Filed May 24, 1954

INVENTOR
JOHN PAUL JONES JR.
BY
Laurence R. Brown
ATTORNEY

United States Patent Office 2,819,395

Patented Jan. 7, 1958

2,819,395

DRIVING CIRCUITS FOR STATIC MAGNETIC ELEMENTS

John Paul Jones, Jr., Pottstown, Pa., assignor to Burroughs Corporation, Detroit, Mich., a corporation of Michigan Application May 24, 1954, Serial No. 431,678

5 Claims. (Cl. 250—27)

This invention relates to pulse forming circuits and more particularly to driving circuits for providing square wave current pulses to static magnetic storage devices.

Magnetic storage elements having cores displaying a substantially rectangular hysteresis characteristic have been used extensively in switching and memory circuits because of their static storage properties. The static storage state of such magnetic elements can be interrogated with a current pulse of substantially square waveform applied to a read-out winding about the magnetic cores. The properties of usual current waveform generators, however, are not ideally suited for interrogating these magnetic storage elements because the magnetic elements require a low impedance driving source, and the elements present a variable load which tends to cause transients disturbing the reliability of the pulse generator.

A plurality of sequential interrogation pulses are desirable in operating different elements of magnetic shift registers or matrix storage systems in a particular order. These sequential interrogation pulses must be capable of synchronization with a clock pulse or some other timing source in computer circuits. Thus, a generator is desired which may be triggered to deliver a sequence of two or more time current waveforms. For the usual shift register operation a pair of shifting pulses are applied in alternate succession to two different sets of interrogation or shifting windings. These current pulses must deliver considerable power in order to drive a series of magnetic elements into saturation.

Accordingly, it is an object of this invention to provide improved driving circuits for delivering current pulses to static magnetic storage elements.

A further object of the invention is to provide driving circuits for delivering a sequence of current pulse waveforms.

Another object of the invention is to provide a low impedance driving source for delivering current pulses to magnetic storage devices.

Other objects and features of the invention will be found throughout the following specification.

The pulse forming circuit provided by the embodiments of the invention described herein comprises a transformer coupled single shot oscillator having a tuned resonant grid driving circuit damped for a single oscillation cycle thereby determining the width of the output pulse. The oscillator is driven by a constant current pentode tube which has the load circuit connected in series with the discharge path so that changes in loading due to switching of the magnetic storage elements will not disturb the reliability of the pulse generator. The pentode is normally cut-off to permit triggering from a clock source.

In order to provide substantially square wave output pulses of high current, a grid limiting circuit is provided for limiting the positive excursion of the grid, thereby causing the amplifier to produce a square wave current output pulse. The leading and trailing edges of the current pulse may be varied in slope and this may be accomplished by first selecting the amplitude of sine wave drive to the grid circuit from the tuned circuit, and thereafter selecting the grid current limiting potential to correspond to the desired percentage of the amplitude of the driving sine wave. Thus, the slope may be selected to be within the range between a square waveform and a trapezoidal waveform, if desired.

In one embodiment of the invention a single driving transformer is used in order to provide two successive current pulses at separate leads from a single trigger pulse for driving two element per bit magnetic shift register circuits. Thus, a further pentode tube is caused to conduct in opposite phase from the initial tube by the oscillatory grid input circuit so that a successive two step conduction takes place in the respective pentodes without the provision of a further transformer driving circuit. This concept is extended to include a multiple step sequence by providing a further blocking oscillator transformer between successive pairs of driving pentodes, so that each driven circuit may receive the full power available from a separate driving tube.

A more detailed description of the invention and its operation is considered hereinafter with reference to the accompanying drawings, wherein.

Throughout the drawings like reference characters are used to designate similar elements to facilitate comparison.

Figure 1:
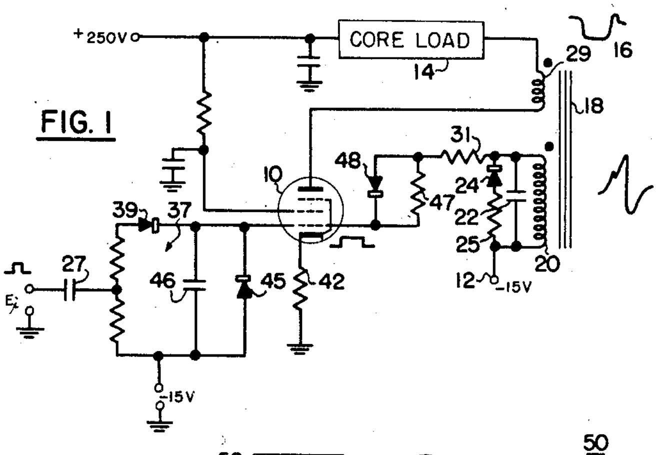
Fig. 1 is a schematic circuit diagram of a square wave generator constructed in accordance with the invention.

In Fig. 1 the pulse generator comprises a constant current pentode tube 10 which is normally biased to cut-off by a negative potential at terminal 12. The pentode tube is connected to supply current pulses to one or more series connected magnetic memory core windings designated by the block load circuit 14. Because of the constant current characteristic of the pentode amplifier 10, variations of the load impedance in the manner generally occurring in magnetic memory elements when the storage state is switched from one condition to another will not affect the shape of output waveform 16.

The output waveform 16 is derived by means of a single shot oscillator circuit utilizing the feedback transformer 18. The control grid input winding 20 of this transformer is tuned to a particular frequency by means of capacitor 22 and is critically damped for a single cycle of oscillation at this frequency by means of diode 24 and resistor 25. An input voltage pulse $E_1$ of positive polarity applied at capacitor 27 may cause the amplifier tube 10 to conduct. Upon conduction, current flow through the transformer winding 29 provides a feedback potential to the grid circuit of amplifier 10 thereby maintaining conduction throughout the positive half of the oscillation cycle. As the oscillator cycle goes negative, the amplifier tube is again cut-off and remains in this condition until a succeeding trigger pulse arrives at the input capacitor 27. Thus, the width of the output pulse is determined by the half sine wave provided by the tuned circuit 20, 22.

Figure 2:
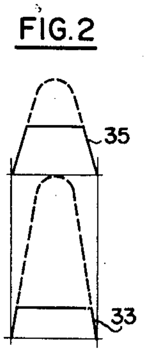
Fig. 2 is a waveform chart indicating the manner of determining the current waveform shape provided by pulse generators of the invention.

In order to provide substantially square wave current output pulses, which are necessary in order to operate magnetic storage elements successfully, a grid lead resistor 31 is provided to prevent the grid from following the entire positive input potential excursion. The clipping action afforded by this resistor is indicated in the waveforms 33 and 35 of Fig. 2. By changing the size of the grid lead resistor 31, the amplitude of the positive peak grid potential may be varied. In addition, the amplitude of the input half sine wave from the tuned circuit may be varied by choosing the number of turns upon the transformer winding 20. With a choice of these two parameters, the shape of the current pulse may be varied from the substantially square waveform 33 to the substantially trapezoidal waveform 35. This function may be desirable in order to operate magnetic storage circuits reliably with driving pulses having a slow rise time as described in the copending application of Lyle G. Thompson, Serial No. 426,350, filed April 29, 1954, for "Magnetic Memory Storage Circuits and Apparatus."

An input triggering circuit 37 is provided with a series connected clamping diode 39 in such polarity that the input trigger pulse is effectively decoupled from the amplifier tube grid as soon as regenerative feedback begins, thereby making the output waveform substantially independent of the shape of the trigger pulse. In order to provide more linear amplification, a cathode resistor 42 is used for degeneration in the amplifier circuit 10. The pentode amplifier operated in this manner is a low impedance driver entirely suitable for driving the windings of magnetic storage elements directly without the intervention of cathode follower coupling circuits, or the like.

In order to provide improved high repetition frequency operation of the pulse generator, the clamping diode 45 and accompanying capacitor 46 are included in the input triggering circuit to provide faster return of the control grid circuit to its stable cut-off position. This circuit is necessary only when the time constant of the oscillation circuit becomes large enough with respect to the repetition frequency that the control grid of amplifier tube 10 does not reach equilibrium in time for a succeeding trigger pulse. Thus, the control grid is effectively immediately returns to the —15 volt biasing potential level as the oscillation cycle begins its negative excursion.

The necessary amount of grid circuit impedance is provided without otherwise limiting the positive excursion of the grid circuit of pentode 10 more than desired by shunting part of the grid leak resistance 47 with diode 48.

Figure 3:
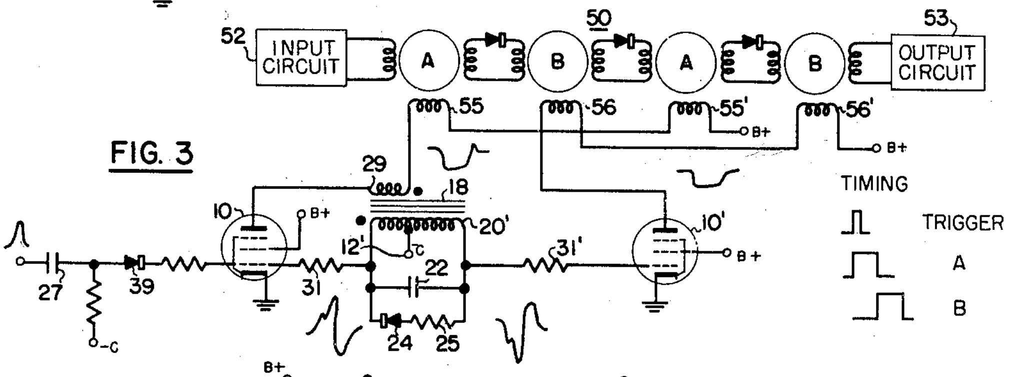
Fig. 3 is a schematic circuit diagram of a two step sequential driver circuit of the invention.

A modified circuit embodiment of the invention providing two successive current pulses for driving a conventional magnetic shift register circuit is shown in Fig. 3. The shift register 50 is comprised of alternate magnetic storage elements A and B. Input information from the input circuit 52 may be progressively advanced from one element to another along the shift register circuit 50 to the output circuit 53 by means of alternate driving current pulses at the respective shift windings 55 and 56 in the manner described in the article appearing in Electronic Engineering, December 1950, by A. D. Booth and entitled "An electronic digital computer."

Operation of the driving pulse for the A storage elements of this register is identical to that explained in connection with Fig. 1. The tuned circuit, however, has a substantially, though not necessarily, center tapped winding 20' at which the cut-off bias potential —C is applied from a source not shown in the drawing to the center tap 12'. This provides the single oscillation cycle in the same manner, but provides potentials at opposite ends of the tuned circuit which are 180° out of phase. Therefore, by connecting a further pentode amplifier 10', for square wave conduction on the second half of the oscillation cycle in the same general manner hereinbefore described, a single trigger pulse will provide at the control grids of the tubes 10 and 10' two successive input driving pulses A and B, which are related in the manner shown in the accompanying timing chart in Fig. 3. In this circuit, therefore, a pair of driving pulse waveforms may be provided successively to alternate cores A and B with only one pulse forming network, even though the current paths of the two successive current pulses are kept entirely distinct.

Figure 4:
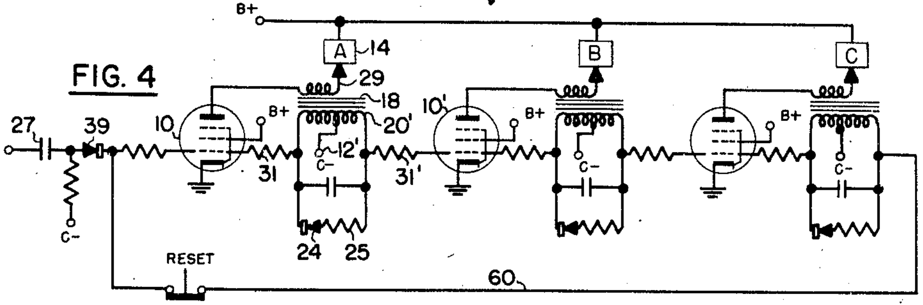
Fig. 4 is a schematic circuit diagram of a multi-step driver circuit constructed in accordance with the invention.

This concept may be expanded as shown in Fig. 4 to include any desired number of successive pulses for the different load circuits A, B, C, etc. This type of circuit, when provided with a reentrant loop 60, may be termed a cyclic distributor since a single input trigger pulse will cause a succession of current pulses at the corresponding loads until the pulse driving the last load retriggers the circuit for again providing the same sequence.

Figure 5:
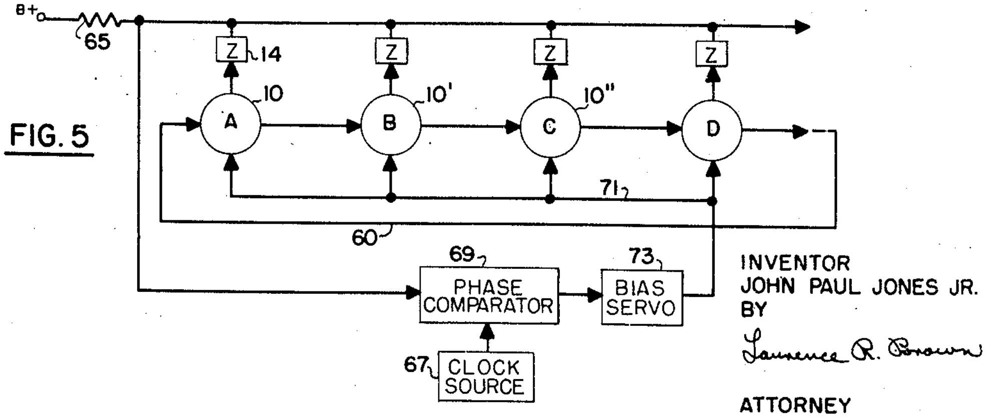
Fig. 5 is a block circuit diagram of a synchronized sequential pulse distributor system of the invention.

In a cyclic distributor circuit of this type used with timed computer systems, it may become necessary to synchronize the distribution of pulses to the loads with a synchronizing or clock pulse source. It has been found that this may be done in connection with the present invention in the manner shown in Fig. 5. By inserting a resistor 65 in the common B+ plate lead of all the driver tubes A, B, C, etc., each successive output pulse of the respective tubes A, B, C, etc. is derived, since the signal current from each output pulse flows through the resistor 65. The pulses thus obtained may be compared with those from a clock pulse source 67 in the phase comparator circuit 69. Phase differences between the two sets of pulses thus cause a corresponding change in a common bias lead 71 to the different drive tubes by means of the bias servo circuit 73. A change in the bias voltage will correspondingly change the repetition frequency of pulses along the respective drivers so that synchronism is maintained with the clock pulse source. This phase control system may be constructed in a conventional manner such as that described by D. Richman in the Proceedings of the Institute of Radio Engineers for January 1954, on pages 106 ff.

From the foregoing description it is seen that the present invention affords improved current pulse generators for driving magnetic storage elements. Accordingly, those novel features believed descriptive of the nature of the invention are defined with particularity in the appended claims.

I claim:

1. A pulse distribution generator for supplying a series of successive current pulses; comprising in combination; a plurality of separate normally cut-off amplifiers each for producing one of said successive current pulses in the series; a coupling circuit between successive amplifiers including a transformer having two windings, means tuning a first winding to a predetermined frequency, means critically damping the tuned circuit for sustaining a single cycle of oscillation, an output circuit including the second winding for a first of the successive amplifiers associated with any coupling circuit, an input circuit coupled to said first amplifier from the tuned circuit completing a one-shot oscillator circuit responsive to input triggering potentials to that amplifier, means coupling the tuned circuit to the second amplifier associated with any coupling circuit to receive therefrom input signals in phase opposition to those received by the first amplifier, and means triggering the first amplifier in the succession into conduction.

2. A generator as defined in claim 1 wherein means is provided in the input circuit of each amplifier to limit conduction, thereby providing substantially square wave output current waveforms.

3. A generator as defined in claim 1 wherein the last successive amplifier is coupled to the first successive amplifier in a reentrant loop.

4. A generator as defined in claim 3 including an automatic frequency control circuit for synchronizing the frequency of pulse repetition with an external timing source.

5. A current pulse generator comprising, in combination, a first amplifier having input and output electrodes; an oscillator circuit coupled to said first amplifier and including a feedback transformer with first and second windings connected respectively to said amplifier input and output electrodes; means tuning said first winding to a predetermined frequency; means critically damping said tuned first winding for a single cycle of oscillation at said frequency; potential limiting means connecting said tuned first winding and said input electrode for clipping one peak of the oscillation waveform to provide a substantially square wave pulse to said input electrode; means normally biasing said amplifier to cut-off; means coupled with said amplifier input electrode for triggering an oscillation cycle; a second amplifier having input and output electrodes; an input circuit for coupling said second-amplifier input electrode to said tuned first winding to apply signals therefrom to said second-amplifier input electrode in phase opposition to those provided to said first-amplifier input electrode; means normally biasing said second amplifier to cut-off; and means in said input circuit of said second amplifier for limiting the potential of the oscillation waveform at said second-amplifier input electrode, thereby to provide a square-wave current pulse at the output electrode of said second amplifier in a sequential timed relationship with the square-wave current pulse provided at the output electrode of said first amplifier.

References Cited in the file of this patent

UNITED STATES PATENTS

| | | |
|---|---|---|
| 2,227,075 | Geiger | Dec. 31, 1940 |
| 2,444,455 | Labin et al. | July 6, 1948 |
| 2,457,580 | Mayer | Dec. 28, 1948 |
| 2,463,685 | Fredendall et al. | Mar. 8, 1949 |
| 2,498,900 | Schoenfeld | Feb. 28, 1950 |
| 2,582,697 | Hepp | Jan. 15, 1952 |
| 2,586,310 | Dill | Feb. 19, 1952 |
| 2,591,406 | Carter et al. | Apr. 1, 1952 |
| 2,600,268 | Sagalyn | June 10, 1952 |
| 2,632,853 | Lindley et al. | Mar. 24, 1953 |
| 2,772,357 | Wang | Nov. 27, 1956 |